A. W. MORGAN.
EARTH-AUGER.
No. 174,083. Patented Feb. 29, 1876.
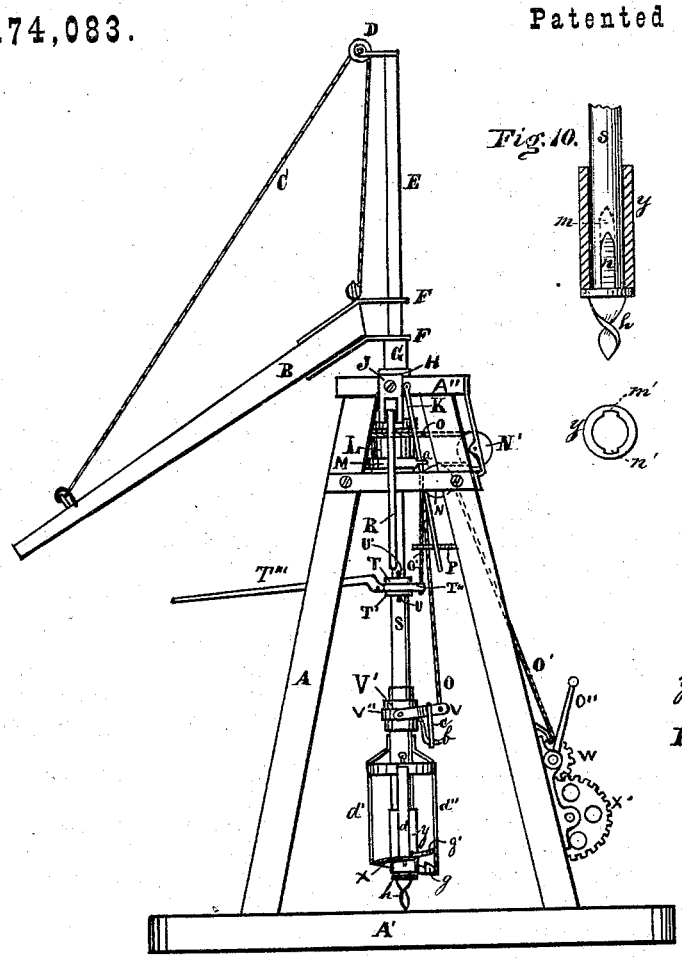
Fig. 1.
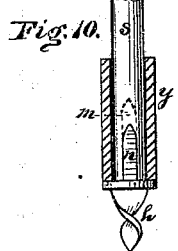
Fig. 10.
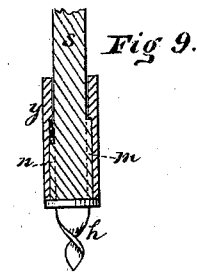
Fig. 9.
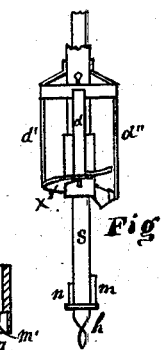
Fig. 6.
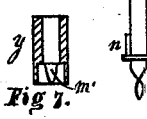
Fig. 7.
Fig. 8.
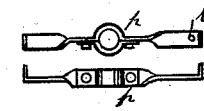
Fig. 3.
Fig. 2.
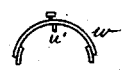
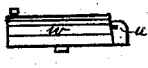
Fig. 4.
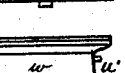
Fig. 5.
Witnesses:
Frank J. Staley
E. D. Scudder
Inventor:
Alfred W. Morgan
Per E. Shrink
Atty.

UNITED STATES PATENT OFFICE.

ALFRED W. MORGAN, OF INDIANAPOLIS, INDIANA.

IMPROVEMENT IN EARTH-AUGERS.

Specification forming part of Letters Patent No. 174,083, dated February 29, 1876; application filed May 19, 1875.

*To all whom it may concern:*

Be it known that I, ALFRED W. MORGAN, of Indianapolis, Marion county, State of Indiana, have invented a new and useful Improvement in Well-Boring Apparatus, of which the following is a specification:

This invention relates to that class of apparatus designed for boring wells, in which the spiral point of an auger is used, with a frame attached and extending above the auger-point, the frame-work being arranged so as to be left open, as in boring in earth that will pack, or to be inclosed by side pieces attached for boring in loose earth, quicksand, or mud, and to prevent the same from leaking back into the well as the auger and frame are drawn up. There is also an attachment called an enlarging-auger, with an adjustable apron above, which is arranged to be secured to the cylinder of the auger and frame, which is designed to enlarge the hole above the auger-point and to bring up the earth deposited on the apron; the whole device being operated by a horse or other power, attached to a suitable device, such as a sweep, for the purpose of loosening the earth and raising the same from the well.

The object is the construction and combination of the several parts claimed hereafter, and which are more or less connected with other devices, some of which were granted to me in my patent of February 24, 1874, which are necessary to complete a perfect working machine.

In the drawings, Figure 1 represents a side elevation of the apparatus embodying my improvement. Fig. 2 represents details of the apron that is placed over the enlarging-auger, and with which is attached to the frame above the spiral auger-point. Fig. 3 represents a plan and side view of the enlarging-auger. Fig. 4 are details of the semicircle sides designed to be attached to the frame above the auger-point, to prevent quicksand, loose earth, or mud from leaking back as the earth is elevated to the top of the well. Fig. 5 represents a detached view of the spiral auger-point with frame, and enlarging-auger with apron, secured to the cylinder. Fig. 6 is a detached view of the auger-point and frame, showing the boring-shaft projecting below. Fig. 7 is a sectional view of the lower part of the cylinder that slides on the boring-shaft, and to which the auger-point is attached. Fig. 8 is an end view of the auger and cylinder. Figs. 9 and 10 represent enlarged detail views of the point and plates as secured to the shaft, and the manner in which they prevent the cylinder from turning when in the position as shown.

A A' represent the frame of the machine, and is placed over the place where the well is to be bored. On the top of the uprights A of the frame is a cap, A'', through which, near the center, is a hole in which works a flanged sleeve, H, and above this sleeve is a washer-sleeve, G. These two are provided with a square hole through which the boring-shaft E works up and down.

The sleeve G is made long enough so that the square sockets F F of the sweep B can rest upon it and revolve free from the cap A'' of the frame. The ends of the sockets F F' fit on the square boring-shaft E, and the other ends are secured to the sweep B, all of which can be elevated on the boring-shaft E by means of the rope C, which is secured to the sweep B near the square sockets F, and extends upward over the sheave D, which is secured to the upper end of the boring-shaft E, and is then carried to the end of the sweep B and secured.

By this arrangement the depth of the cut of the auger is regulated, by raising the sweep B as high above the sleeve G as is required for the auger to enter the ground.

Immediately under the cap A'' is a clutch-coupling with a square hole in it for the boring-shaft E to work in, and is operated by the forked lever R. This clutch-coupling and the one that it engages with—that is, in the drum L—is not shown, but is of the ordinary form of such couplings. The boring-shaft E passes through the sleeves H and G, and through the clutch-couplings and drum L, and has a wedge-shaped point, which enters a wedge-shaped socket in the upper end of the shaft S, and is secured by the key or pin U, under the sleeve T' and collar T'', with a collar, T, above the sleeve T''', which is also secured by the key or pin U'.

The shaft S extends downward through the cylinder $y$, and is provided at the bottom with a flat steel plate, $h$, which is twisted into a spiral form and pointed so as to act as a bit and force its way into the earth, and loosen the earth so that the diamond-shaped lips $x$ of the auger will take hold of the earth freely. Immediately above the bit $h$, and extending up a short distance on each side of the shaft S, are secured two plates, having the points wedge-shaped, as at $m\,n$, Fig. 6. One of these plates is a little longer than the other. These plates enter into a socket in the bottom of the cylinder $y$, which is also provided with recesses corresponding with those on the shaft S, as shown in Fig. 7.

This arrangement forms a clutch-coupling, when together. The wedge-shaped points on the plates $m\,n$ allow the cylinder $y$, with the auger and frame attached, to always find its bearing when lowered onto the point of the shaft S, and causes it to revolve when the shaft revolves. But when the auger and frame are raised, as in removing dirt from the well, then the clutch becomes separated, and the auger and frame will not revolve.

The auger-frame is secured to the auger at the bottom and to a band at the top, and the whole arrangement is secured to the cylinder $y$. The two bars $d''$ are stationary, and the two bars $d\,d'$ are removable, and all of them have a cutting-edge on one side. The point of the auger is diamond-shaped, as shown in Fig. 8. At the upper end of the auger-frame, and attached to the cylinder $y$, is a swivel, $V'$, with a sleeve, $V''$, working thereon. On this sleeve is pivoted the forked arm $V$, which extends far enough to form a key by engaging with the side of the well, thus preventing the sleeve $V''$ from turning around. To the arm V is attached one end of a spring, $c$, the other end being attached to the arm $b$, that is attached to the sleeve $V''$, and gives a tension to the arm V, and holds it in contact with the side of the well.

To the forked arm V is also attached a rope, O, which extends upward over the pulleys, N N', and is secured to the drum L—all arranged so that when the auger becomes full of earth the lever R can be raised. This throws the clutch that is under the cap $A''$ into gear with the drum L, and, as the sweep B is revolved, the drum revolves, and the rope O is wound up, and the auger, with its load of earth, is drawn up the shaft S. After the earth has been delivered the lever R is lowered, and the clutch becomes disengaged from the drum. Then, by loosening the brake M by means of the lever K, the auger will slide down the shaft S into the well again for a fresh supply, the drum L revolving on a loose sleeve. The brake-lever R is held fast or loose by the rack P.

The rope O' is attached to the windlass $x'$, and extends upward and over a pulley set by the side of pulley N, and then extends downward, and is secured to the sleeve $T''$. This arrangement is to give the operator full control of the auger—that is, by working the crank $O''$ he can graduate the speed of the auger in entering the ground. If it feeds too fast he can hold it or let it run, as he pleases. He can also raise and lower the auger, to clean it from obstacles, and work them above the auger-point, if necessary.

The lever $T'''$ is hinged to the sleeve $T''$, and extends out between the uprights of the frame, and prevents the sleeve $T''$ from turning around, and twisting the rope O' around the shaft E.

Fig. 3 represents an enlarging-auger, which can be attached to the cylinder $y$, as shown in Fig. 5. Above this is secured the aprons $r$, Fig. 2, which are hooked into the enlarging-auger by the hook $t$ entering the hole $t'$, Fig. 3; and the hook $u$ on the projecting arm of the apron enters the hole $o$ in the upright bar $d''$ of the frame of the auger. (Shown in Fig. 5.) There are two of these aprons $n$, one on each side of the auger-frame, and are designed to enlarge the well, and take out the earth that is deposited on the aprons. The aprons are so arranged that they will tip to one side, and dump the earth when above the ground.

Fig. 4 shows an end plan and side view of the semicircular side pieces W, used and attached to the sides of the frame of the auger while working in loose earth, quicksand, or mud, and these, together with the valve $g'$, made of rubber, close all openings in the frame, so that the fine earth, sand, and mud will not leak back into the well in elevating it to the top.

In raising the auger out of the well the pin U is drawn out from the shafts S and E, and the shaft E is raised enough to allow the wedge-shaped end to clear the wedge-shaped plates in the socket in the upper end of shaft S, and leave the shaft E free to revolve in the socket; and, as the auger with its load of earth comes up above the ground, then the pin $U'$, that holds the collar T from rising, is removed, and the auger goes up, carrying the sleeve $T''$, collars T and $T'$ with it, until the auger is sufficiently high to remove the earth. This is all accomplished without having to remove the shaft S from the well until finished.

While the auger is at work in the well, and boring its way downward, the bottom of the auger is well supplied with air that passes down the cylinder $y$, around the shaft S, and prevents any vacuum under the auger while boring, as when being elevated.

What I claim as new, and wish to secure by Letters Patent, is—

1. The diamond-shaped lip $x$ of the auger, constructed and arranged to operate substantially as and for the purposes set forth and described.

2. The combination of the frame $d\,d'\,d''$ with the diamond-shaped lip $x$ of the auger, the point $h$, and cylinder $y$, constructed substantially as set forth and described.

3. The plates $m$ $n$, having wedge-shaped points, in combination with the shaft S and corresponding-shaped sockets in the bottom of the cylinder $y$ of the auger, constructed substantially as specified.

In testimony whereof I have signed my name to this specification in the presence of two subscribing witnesses.

ALF. W. MORGAN.

Witnesses:
  W. T. RIPLEY,
  GEO. F. DAVID.